G. T. HANCHETT.
TORQUE TUBE CONSTRUCTION.
APPLICATION FILED JULY 24, 1914. RENEWED JULY 22, 1915.
1,172,524. Patented Feb. 22, 1916.
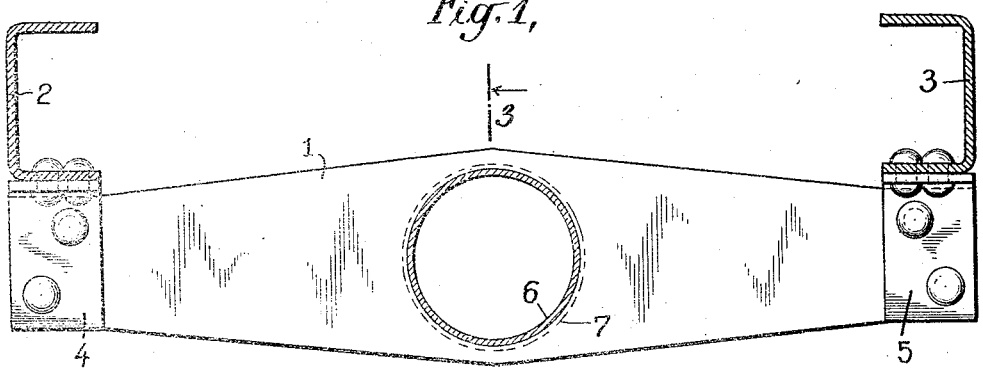
Fig. 1,
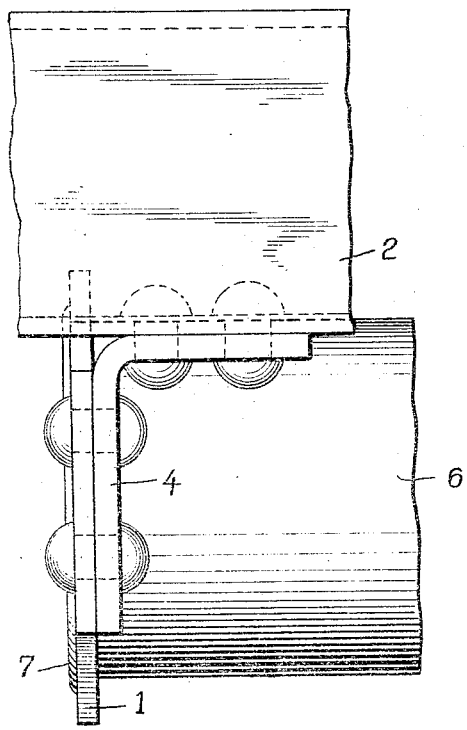
Fig. 2,
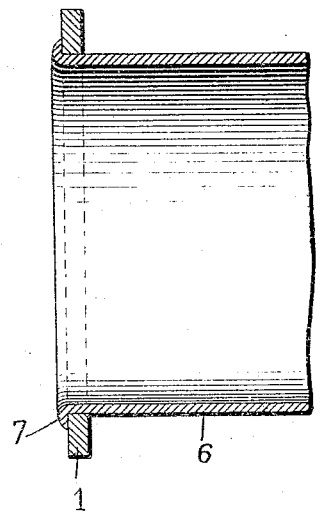
Fig. 3.
WITNESSES
Dyer Smith
J. McIntosh
INVENTOR
George T. Hanchett
BY
J. C. Edmunds
ATTORNEY

UNITED STATES PATENT OFFICE.

GEORGE T. HANCHETT, OF NEW YORK, N. Y.

TORQUE-TUBE CONSTRUCTION.

1,172,524. Specification of Letters Patent. Patented Feb. 22, 1916.

Application filed July 24, 1914, Serial No. 852,830. Renewed July 22, 1915. Serial No. 41,393.

*To all whom it may concern:*

Be it known that I, GEORGE T. HANCHETT, a citizen of the United States, residing in the borough of Manhattan, city, county, and State of New York, have invented certain new and useful Improvements in Torque-Tube Construction, of which the following is a specification.

My invention relates to the construction and mounting of torque tubes and the supporting frame members therefor, in automobiles.

The torque tube, inclosing the shaft extending from the differential gears to the transmission gears in an automobile, is commonly provided with a universal joint at its end distant from the differential gears, to permit the movements to which the differential gears and their casing are subjected during the operation of the car, without undue strain upon the torque tube. By my invention, the necessity of employing a universal joint at this point is obviated, and a simplified and cheapened, but effective, construction is provided. I accomplish these desirable results by supporting the end of the torque tube, distant from the differential gears, from a cross-member, which is so formed and connected to the torque tube as to permit movement of the tube about its point of support in the same manner as a universal joint. In my preferred construction, the cross-member is a relatively thin and flexible plate, mounted in a vertical plane between the side frame members of the car, the end of the torque tube extending through and fitting in an opening in the cross-member, the end of the tube being expanded or crimped peripherally about the opening to form a retaining flange or bead for securing the tube in position in the cross-member. The latter is rigid in a vertical plane, to support the tube, while at the same time the lateral flexibility of the cross plate and the method of mounting the torque tube therein are such as to permit the requisite movement of the torque tube about a pivotal point located at the axis of the tube within the plane of the cross-member.

In order that a clearer understanding of my invention may be had, attention is hereby directed to the accompanying drawings forming part of this specification, and illustrating a preferred embodiment thereof.

In the drawings, Figure 1 represents a front elevation of the devices described, partly shown in section, Fig. 2 is a partial end view of the same and Fig. 3 is a section taken on line 3—3 of Fig. 1.

Referring to the drawings, the cross-member 1 is secured at its ends in any suitable manner to the side frame members 2 and 3. In the embodiment of my invention illustrated, the frame side-members are structural shapes of channel section, and the cross-member is secured to the lower horizontal flanges of the side-members, by means of pieces 4 and 5, bent to the form of a right angle, the horizontal portions of which are riveted or otherwise secured to the lower horizontal flanges of the side-members and the vertical portions of which are similarly secured to the cross-member 1.

The torque tube 6 extends from the differential gears of the car parallel to and intermediate between side members 2 and 3. The end of the torque tube extends a short distance through an opening made to fit the same in the cross-member intermediate the ends of the same, the end of the torque tube being expanded or crimped peripherally as shown at 7, to form a retaining bead or flange whereby the tube is secured to the cross-member. The cross-member comprises a thin and relatively elastic metallic plate mounted in a vertical plane as shown, this plate being of sufficient rigidity in a vertical plane to support the tube, while at the same time the plate will flex laterally to permit the necessary amount of pivotal movement of the torque tube about the intersection of the axis of the tube with the plane of plate 1. Preferably, plate 1 is of maximum height in the vertical plane intersecting the axis of the torque tube, the upper and lower edges of plate 1 sloping somewhat downwardly and upwardly, respectively, from this plane to the ends of the cross-member.

It should be understood that my invention is not limited strictly to the exact details of construction shown and described, but that a reasonable range of equivalents is comprised thereby.

Having now described my invention, what I claim as new therein and desire to secure by Letters Patent is as follows:—

1. In an automobile, the combination of frame side-members, a cross-member secured at its ends to said side-members, comprising a relatively thin and flexible metallic plate mounted in a vertical plane, and a torque tube having its end secured to said cross-member, substantially as set forth.

2. In an automobile, the combination of frame side-members, a cross-member secured at its ends to said side-members, comprising a relatively thin and flexible metallic plate mounted in a vertical plane, and a torque tube having its end mounted in an opening in said cross-member, and expanded around the opening to secure the end of said tube to the cross-member, substantially as set forth.

3. In an automobile, the combination of frame side-members, a cross-member extending between and secured to said side-members, and a torque tube having its end distant from the differential gears mounted in an opening in said cross-member, said cross-member being rigid in a vertical plane but somewhat flexible in a direction parallel to the torque tube, and said torque tube having its end extending through said opening enlarged peripherally around said opening, substantially as set forth.

4. In an automobile, the combination of frame side-members having horizontal flanges, a cross-member extending between said side-members and secured to said flanges, comprising a relatively thin and flexible metallic plate mounted in a vertical plane, and of a gradually increasing height from its ends to a point intermediate between said side-members, and a torque tube having its end extending through an opening in said cross-member intermediate its ends, said end being enlarged peripherally around said opening, substantially as set forth.

This specification signed and witnessed this 3rd day of June, 1914.

GEORGE T. HANCHETT.

Witnesses:
F. D. DORMAN,
M. E. BUTLER.

Copies of this patent may be obtained for five cents each, by addressing the "Commissioner of Patents, Washington, D. C."